US007758841B2

(12) United States Patent
Billups et al.

(10) Patent No.: US 7,758,841 B2
(45) Date of Patent: Jul. 20, 2010

(54) REDUCTIVE FUNCTIONALIZATION OF CARBON NANOTUBES

(75) Inventors: W. Edward Billups, Houston, TX (US); Anil K. Sadana, Houston, TX (US); Feng Liang, Houston, TX (US); Robert H. Hauge, Houston, TX (US)

(73) Assignee: William Marsh Rice University, Houston, TX (US)

( * ) Notice: Subject to any disclaimer, the term of this patent is extended or adjusted under 35 U.S.C. 154(b) by 394 days.

(21) Appl. No.: 10/592,463

(22) PCT Filed: Mar. 11, 2005

(86) PCT No.: PCT/US2005/008303

§ 371 (c)(1), (2), (4) Date: Sep. 11, 2006

(87) PCT Pub. No.: WO2005/090233

PCT Pub. Date: Sep. 29, 2005

(65) Prior Publication Data

US 2007/0196262 A1 Aug. 23, 2007

Related U.S. Application Data

(60) Provisional application No. 60/611,045, filed on Sep. 17, 2004, provisional application No. 60/552,550, filed on Mar. 12, 2004.

(51) Int. Cl.
*D01F 9/12* (2006.01)

(52) U.S. Cl. ................. 423/447.1; 423/447.2; 423/448; 423/449.1; 423/449.2

(58) Field of Classification Search .............. 423/447.1, 423/448, 447.2; 526/173; 524/495; *D01F 9/12*
See application file for complete search history.

(56) References Cited

U.S. PATENT DOCUMENTS 5,145,924 A * 9/1992 Shero et al. ................. 526/225

FOREIGN PATENT DOCUMENTS

WO WO 02060812 A2 * 8/2002
WO WO 2005/012172 2/2005

OTHER PUBLICATIONS

Ajayan et al. Journal of American Chemical Society (2003), 125, 9258-9259, entitled "Single-step in situ synthesis of polymer-grafted single-wall nanotube composites".*
Pekker et al. J. Phys. Chem. B (2001) 105, 7938-7943, entitled "Hydrogenation of carbon nanotubes and graphite in liquid ammonia".*

(Continued)

*Primary Examiner*—Jerry Lorengo
*Assistant Examiner*—Heng M Chan
(74) *Attorney, Agent, or Firm*—Winstead PC

(57) ABSTRACT

The present invention is directed to novel processes for the functionalization (derivatization) of carbon nanotubes and, as an extension, to fullerenes and other carbon surfaces. Generally, such processes involve reductive pathways. In some embodiments, carbon nanotubes are reacted with alkali metal and organic halides in anhydrous liquid ammonia. In other embodiments, polymers are grown from carbon nanotube sidewalls by reacting carbon nanotubes with alkali metal and monomer species in anhydrous liquid ammonia.

24 Claims, 16 Drawing Sheets

100 101 102

OTHER PUBLICATIONS

Zhu et al. J. Phys. Chem. B (2003) 107, 12899-12901, entitled "Concise route to functionalized carbon nanotubes".*

Jia et al."Study on poly(methyl methacrylate)/carbon nanotube composites" Materials Science and Engineering A271 (1999) 395-400.*

"A convenient route to functionalized carbon nanotubes" published in Nano Letters (2004) vol. 4, No. 7, p. 1257-1260 by Liang et al.*

Illjima et al., "Single-Shell Carbon Nanotubes of 1-nm Diameter", Nature, (1993) 603.

Bethune et al, "Cobalt-Catalysed Growth of Carbon Nanotubes with Single-Atomic-Layer Walls", Nature (1993) 363, pp. 605-607.

Endo et al., "The Production and Structure of Pyrolytic Cargon Nanotubes (PCNTs)", J. Phys. Chem. Solids (1993), 54, pp. 1841-1848.

Zhu et al., "Improving the Dispersion and Integration of Single-Walled Carbon Nanotubes in Epoxy Composites throught Functionalization", Nano Lett. (2003) 3, pp. 1107-1113.

Baughman et al., "Carbon Nanotubes—the Route Toward Applications", Science, (2002) 297, pp. 787-792.

Chen et al., "Solution Properties of Sing-Walled Carbon Nanotubes", Science (1998) 282, pp. 95-98.

Mickelson et al., "Fluorination of Single-Wall Carbon Nanotubes", Chem. Phys. Lett., (1998) 296, pp. 188-194.

Boul et al., "Reversible Sidewall Functionalization of Buckytubes", Chem. Phys. Lett. (1999) 310, pp. 367-372.

M. S. Dresselhaus et al., "Science of Fullerenes and Carbon Nanotubes", Academic Press, San Diego (1996), vol. 1.

V. N. Khabashesku et al., "Chemistry of Carbon Nanotubes in Encyclopedia of Nanoscience and Nanotechnology", American Scientific Publishers, (2004) pp. 849-861.

Bahr et al., "Covalent Chemistry of Single-Wall Carbon Nanotubes", J. Mater. Chem. (2002) 12, pp. 1952-1958.

Holzinger et al., "Sidewall Functionalization of Carbon Nanotubes", Angew. Chem. Int. Ed. (2001) 40, pp. 4002-4005.

Peng et al., "Sidewall Functionalization of Singe-Walled Carbon Nanotubes with Organic Peroxides", Chem. Commun. (2003), pp. 362-363.

Ying et al,. "Functionalization of Carbon Nanotubes", Org. Lett. (2003) 5, pp. 1471-1473.

Peng et al., "Sidewall Carboxylic Acid Functionalization of Single-Walled Carbon Nanotubes", J.Am, Chem. Soc. (2003) 125, pp. 15174-15182.

Coleman et al., "Functionalization of Single-Walled Carbon Nanotubes via the Bingel Reaction", J. Am. Chem. Soc. (2003) 125, pp. 8722-8723.

Pekker et al., "Hydrogenation of Carbon Nanotubes and Graphite in Liquid Ammonia", J. Phys. Chem. B. (2001) 105, pp. 7938-7943.

O'Connell et al., "Band Gap Fluorescence from Individual Single-Walled Carbon Nanotubes", Science, (2002) 297, pp. 593-596.

Bronikowski et al., Gas-Phase Production of Carbon Single-Walled Nanotubes from Carbon Monoxide via the HIPco Process . . . Am. Vacuum Soc. (2001), 19, pp. 1800-1805.

Saito et al., "Physical Properties of Carbon Nanotubes", Imperial College Press, London, (1998).

Avouris et al., "Molecular Electronics with Carbon Nanotubes", Acc. Chem. Res. (2002) 35, pp. 1026-1034.

Strano et al., "Electronic Structure Control of Single-Walled Carbon Nanotube Functionalization", Science (2003) 301, pp. 1519-1522.

Bachilo et al., "Structure-Assigned Optical Spectra of Single-Walled Carbon Nanotubes", Science (2002) 298, pp. 2361-2366.

Weisman et al., Dependence of Optical Transition Energies on Structure for Single-Walled Carbon Nanotubes in Aqueous Suspen . . . Nano. Lett., (2003) 3, pp. 1235-1238.

Liu, et al., "Fullerene Pipes", Science, 280:1998, pp. 1253-1256.

Hsieh, et al., "Anionic Polymerization: Principles and Practical Applications (Plastics Engineering Series, No. 34)", CRC Press: Boca Raton, Florida, 1996, p. 108.

Eberson, et al., "Radical Ion Reactivity-I: Application of the Dewar-Zimmerman Rules to Certain Reactions of Radical Anions and Cations", Tetrahedron, 34:1978, pp. 731-739.

Office Action from U.S. Appl. No. 10/632,419, mailed Oct. 16, 2006.

Office Action from U.S. Appl. No. 10/632,419, mailed May 15, 2007.

Office Action from U.S. Appl. No. 10/632,419, mailed Nov. 28, 2007.

Office Action from U.S. Appl. No. 10/632,419, mailed May 20, 2008.

* cited by examiner 100 101 102

Scheme 1

2

1a $CH_3(CH_2)_{11}I$
1b $CH_3(CH_2)_3I$
1c $CH_3(CH_2)_3Br$
1d $CH_3CH_2CHICH_3$
1e THP-O-$(CH_2)_3I$
1f $H_2NCOCH_2I$

REDUCTIVE FUNCTIONALIZATION OF CARBON NANOTUBES

CROSS-REFERENCE TO RELATED APPLICATIONS

This Application claims priority to U.S. Provisional Application Ser. Nos. 60/552,550, filed Mar. 12, 2004; and 60/611,045, filed Sep. 17, 2004.

This invention was made with support from the Office of Naval Research, Grant No. N00014-01-1-0789.

FIELD OF THE INVENTION

This invention relates generally to carbon nanotubes, and specifically to methods of derivatizing carbon nanotubes via reductive pathways.

BACKGROUND OF THE INVENTION

Carbon nanotubes (CNTs, aka fullerene pipes) are nanoscale carbon structures comprising graphene sheets conceptually rolled up on themselves and closed at their ends by fullerene caps. Single-walled carbon nanotubes (SWNTs) comprise but a single such graphene cylinder, while multiwalled nanotubes are made of two or more concentric graphene layers nested one within another in a manner analogous to that of a Russian nesting doll. Since their initial preparation in 1993 (Iijima et al., *Nature,* 1993, 363, 603; Bethune et al., *Nature,* 1993, 363, 605; Endo et al., *Phys. Chem. Solids,* 1993, 54, 1841), SWNTs have been studied extensively due to their unique mechanical, optical, electronic, and other properties. For example, the remarkable tensile strength of SWNTs has resulted in their use in reinforced fibers and polymer nanocomposites (Zhu et al., *Nano Lett.* 2003, 3, 1107 and references therein). For other existing and potential applications of CNTs, see Baughman et al., *Science,* 2002, 297, 787-792.

SWNTs normally self-assemble into aggregates or bundles in which up to several hundred tubes are held together by van der Waals forces. For many applications, including biomedical ones, the separation of individual nanotubes from these bundles is essential. Such separation improves the dispersion and solubilization of the nanotubes in the common organic solvents and/or water needed for their processing and manipulation. Covalent modifications of the SWNT surface generally help to solve this problem by improving the solubility/suspendability and processability of the nanotubes. While chemical functionalizations of the nanotube ends generally do not change the electronic and bulk properties of these materials, sidewall functionalizations do significantly alter the intrinsic properties of the nanotubes (Chen et al., *Science,* 1998, 282, 95-98; Mickelson et al., *Chem. Phys. Lett.,* 1998, 296, 188-194) and typically have a more profound impact on their solubility/suspendability (Boul et al., *Chem. Phys. Lett.,* 1999, 310, 367-372). However, the extent of documented results in this new field of chemistry is limited, primarily due to the current high cost of the nanotubes.

Additional challenges faced in the modifications of SWNT sidewalls are related to their relatively poor reactivity—largely due to a much lower curvature of the nanotube walls relative to the more reactive fullerenes (M. S. Dresselhaus, G. Dresselhaus, P. C. Eklund, *Science of Fullerenes and Carbon Nanotubes*, Academic Press, San Diego, 1996, Vol. 1), and to the growing strain within the tubular structure with increasing number and size of functional groups attached to graphene walls. The $sp^2$-bonding states of all the carbon atoms comprising the nanotube framework facilitate the predominant occurrence of addition-type reactions. The best characterized examples of these reactions include additions to the SWNTs of nitrenes, azomethine ylides and aryl radicals generated from diazonium salts (V. N. Khabashesku, J. L. Margrave, *Chemistry of Carbon Nanotubes in Encyclopedia of Nanoscience and Nanotechnology*, Ed. H. S. Nalwa, American Scientific Publishers, 2004; Bahr et al., *J. Mater. Chem.,* 2002, 12, 1952; Holzinger et al., *Angew. Chem. Int. Ed.,* 2001, 40, 4002). Other reported sidewall functionalizations of SWNTs involve organic radicals (Peng et al., *Chem. Commun.,* 2003, 362; Ying et al., *Org. Lett.,* 2003, 5, 1471; Peng et al., *J. Am, Chem. Soc.,* 2003, 125, 15174) and the Bingel reaction (Coleman et al., *J. Am. Chem. Soc.,* 2003, 125, 8722). Additionally, the addition of hydrogen to the sidewalls of SWNTs has been reported to occur under conditions of the Birch reduction (Pekker et al., *J. Phys. Chem. B,* 2001, 105, 7938).

The diameter and chirality of individual CNTs are described by integers "n" and "m," where (n,m) is a vector along a graphene sheet that is conceptually rolled up to form a tube. When $|n-m|=3q$, where q is a non-zero integer, the CNT is a semi-metal (bandgaps on the order of milli eV). When $n-m=0$, the CNT is a true metal with a bandgap of 0 eV, and referred to as an "armchair" nanotube. All other combinations of n−m are semiconducting CNTs with bandgaps typically in the range of 0.3 to 1.0 eV. See O'Connell et al., *Science,* 2002, 297, 593. CNT "type," as used herein, refers to such electronic types described by the (n,m) vector (i.e., metallic, semi-metallic, and semiconducting). CNT "species," as used herein, refers to CNTs with discrete (n,m) values. CNT "composition," as used herein, refers to make up of a CNT population in terms of nanotube type and species.

All known CNT preparative methods lead to polydisperse CNT populations of semiconducting, semimetallic, and metallic electronic types. See M. S. Dresselhaus, G. Dresselhaus, P. C. Eklund, *Science of Fullerenes and Carbon Nanotubes*, Academic Press, San Diego, 1996; Bronikowski et al., *Journal of Vacuum Science & Technology A* 2001, 19, 1800-1805; R. Saito, G. Dresselhaus, M. S. Dresselhaus, *Physical Properties of Carbon Nanotubes*, Imperial College Press, London, 1998. As such, a primary hurdle to the widespread application of CNTs, and SWNTs in particular, is their manipulation according to electronic structure (Avouris, *Acc. Chem. Res.* 2002, 35, 1026-1034). Recently, however, methods to selectively functionalize CNTs based on their electronic structure (i.e., electronic type) have been reported (Strano et al., *Science,* 2003, 301, 1519-1522; commonly assigned co-pending International Patent Application PCT/US04/24507, filed Jul. 29, 2004). In such reports, metallic CNTs are seen to react preferentially with diazonium species, permitting a separation or fractionation of metallic (including semi-metallic) and semiconducting CNTs via partial functionalization of a mixture of metallic and semiconducting CNTs. For a detailed discussion of CNT types and species, and their optical identification, see Bachilo et al., *Science,* 2002, 298, 2361-2366; and Weisman et al., *Nano. Lett.,* 2003, 3, 1235-1238.

Despite such above-described advances in the chemically derivatizing the sidewalls of carbon nanotubes, most such processes require ultrasonication of the carbon nanotubes during the derivatization process. This sonication can potentially damage many of the nanotubes in the sample. Thus, a method of derivatizing carbon nanotubes under gentler conditions would be very beneficial.

BRIEF DESCRIPTION OF THE INVENTION

The present invention is directed to novel processes (methods) for the functionalization (i.e., chemical derivatization) of carbon nanotubes and, by extension, to fullerenes and other carbon surfaces (i.e., inorganic carbon materials in general). Generally, such processes involve reductive pathways. In some embodiments, carbon nanotubes are reacted with alkali metal and organic halides in anhydrous liquid ammonia. In other embodiments, polymers are grown in situ from carbon nanotube sidewalls by reacting carbon nanotubes with alkali metal and monomer species in anhydrous liquid ammonia.

In some embodiments, the present invention is directed to methods of functionalizing carbon materials, such methods comprising the steps of: (a) combining carbon material with liquid ammonia to form a mixture; (b) dissolving a quantity of alkali metal in the mixture to form a reductive mixture; and (c) adding an organic halide, comprising an organic portion and a halide portion, to the reductive mixture such that the organic portion of the organic halide adds to the carbon material to form derivatized carbon material. One or more of various quenching (to neutralize unreacted alkali metal), acidification (to neutralize unevaporated ammonia), filtering (to collect the derivatized carbon material), and washing (to remove unwanted species from the derivatized carbon material) steps can optionally be performed. Generally, such carbon materials include, but are not limited to, carbon nanotubes, nanoscrolls, fullerenes, diamond, acetylenic carbon, carbon black, activated charcoal, graphitic carbon, and combinations thereof.

In some embodiments, the present invention is directed to methods of growing polymers in situ from carbon surfaces, such methods comprising the steps of: (a) combining carbon material with liquid ammonia to form a mixture; (b) dissolving a quantity of alkali metal in the mixture to form a reductive mixture; and (c) adding a quantity of at least one monomer species to the reductive mixture such that the monomer is polymerized onto/at the carbon material. One or more of various quenching, acidification, filtering, and washing steps can optionally be performed. Such in situ polymerization can yield composite materials comprising carbon materials and polymer. In some embodiments, the monomer is seen to undergo anionic polymerization. In some or other embodiments, the monomer is seen to undergo free radical polymerization. As in the functionalization reactions above, such carbon materials include, but are not limited to, carbon nanotubes, nanoscrolls, fullerenes, diamond, acetylenic carbon, carbon black, activated charcoal, graphitic carbon, and combinations thereof.

Variations on the above-described embodiments include the use of other solvents, like anhydrous amines, instead of, or in addition to, ammonia.

The methods of the present invention are novel in that no similar methods for this type of sidewall functionalization exist. Furthermore, such methods fill a recognized need in the art for a gentle (i.e., not requiring ultrasonication) and scalable process for derivatizing the sidewalls of carbon nanotubes.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
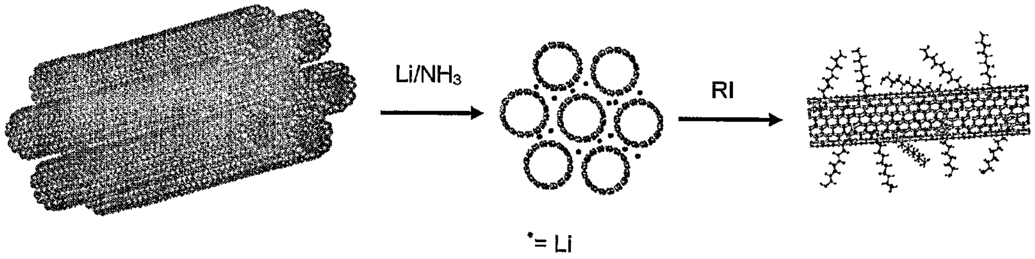
FIG. 1 pictorially illustrates embodiments where a SWNT bundle 100 is reduced in anhydrous liquid ammonia ($NH_3$) by Li to yield reduced intercalated/exfoliated bundle 101, and wherein this intercalated/exfoliated bundle 101 is then reacted with an organic halide (RI) to yield functionalized SWNTs 102.

The present invention is directed to novel processes for the functionalization (derivatization) of carbon nanotubes and, as an extension, to fullerenes and other carbon surfaces. Generally, such processes involve reductive pathways. In some embodiments, carbon nanotubes are reacted with alkali metal and organic halides in anhydrous ammonia. In other embodiments, polymers are grown from carbon nanotube sidewalls by reacting carbon nanotubes with alkali metal and monomer species in anhydrous ammonia.

Carbon nanotubes (CNTs), according to the present invention, include, but are not limited to, single-wall carbon nanotubes (SWNTs), double-wall carbon nanotubes (DWNTs), multi-wall carbon nanotubes (MWNTs), small diameter carbon nanotubes, and combinations thereof. Small diameter carbon nanotubes are defined herein as carbon nanotubes having diameters of at most about 3 nm, regardless of the number of walls. All methods of making CNTs yield product with carbonaceous impurities. Additionally, most methods of making SWNTs, and many methods of making MWNTs, use metal catalysts that remain in the product as impurities. While the examples described herein have generally been done with single-wall carbon nanotubes (SWNTs), it should be understood that the methods and compositions described herein are generally applicable to all carbon nanotubes made by any known method-provided they are susceptible to the chemistries described herein by virtue of their reactivity. Furthermore, the nanotubes can be subjected to any number of post-synthesis procession steps, including cutting, length sorting, chirality sorting, purification, etc., prior to being subjected to the chemical modifications described herein.

For CNTs in particular, functionalization can lead to improved levels of nanotube suspendability/dispersability and/or solubility in solvents. True solubility, it should be noted, is a state in which the re-aggregation of CNTs in a solvent is less favored, on a thermodynamic basis, than their continued solvated state. That said, stable suspensions can suitably permit the manipulation of CNTs for a wide range of processes.

Alkali metals, according to the present invention, are Li, Na, and K. Organic halides (R—X), according to the present invention, comprise an organic portion (R—) and a halide portion (—X). The organic portion can be any organic functionality that suitably provides for an organic halide in accordance with the embodiments of the present invention. Suitable organic functionalities include, but are not limited to, alkyl-, aryl-, allyl-, benzyl-, and combinations thereof. The halide portion is selected from the group consisting of —F, —Cl, —Br, —I, and combinations thereof.

Functionalization Reactions

In some embodiments, the present invention is directed to a process (method) that comprises the following steps: (a) placing carbon nanotubes or other carbon materials in a flame dried three-neck round bottom flask (or other suitable container) equipped with a dry ice condenser; (b) condensing $NH_3$ gas into the flask and then adding very small pieces of alkali metal followed by addition of a quantity of alkyl/aryl halide; (c) allowing the reaction to proceed overnight; (d) quenching the reaction mixture with alcohol, water, and then acidifying with a mineral acid; and (e) filtering the contents through a membrane filter and washing thoroughly with ethanol and then with hexanes to remove by-products. Such processes are unique in that ultrasonication is not a required feature.

A more detailed description of a reductive pathway, being an embodiment of the present invention, that allows carbon nanotubes, or generally any graphitic surface, to be functionalized conveniently follows: Carbon nanotubes were added to a flame-dried three-neck round bottom flask. Ammonia was then condensed into the flask followed by the addition of small pieces of lithium metal. The alkyl/aryl halide was then added and the reaction allowed to proceed overnight as the ammonia evaporated. The reaction mixture was then cooled in an ice bath and quenched by the slow addition of methanol. Water was then added slowly followed by the addition of 10% HCl until the mixture became acidic. The contents were filtered using a 0.2 μm-pore size PTFE (Teflon®) membrane filter. Raman spectra of dodecylated nanotubes, for example, show exceptional functionalization which leads to high solubility in common organic solvents. Atomic force microscope imaging of dodecylated single-wall carbon nanotubes (SWNTs) reveal a plethora of individual carbon nanotubes signifying a substantial exfoliation of the single-wall carbon nanotube bundles that is indicative of significant functionalization. Although the scope of the invention extends beyond the following, functional groups experimentally attached to carbon nanotubes in this manner include: n-dodecyl-, n-butyl-, t-butyl-, n-octyl-, and benzyl-. FIG. 1 illustrates an example of the above-described embodiment, wherein SWNT bundle 100 is reduced in anhydrous liquid ammonia ($NH_3$) by Li to yield reduced intercalated/partially exfoliated bundle 101. This intercalated/partially exfoliated bundle 101 is then reacted with an organic halide (RI) to yield functionalized SWNTs 102.

Figure 2:
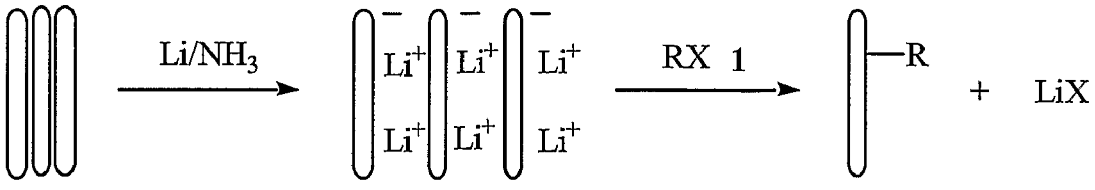
FIG. 2 schematically illustrates the embodiments depicted in FIG. 1 for exemplary organic halides 1*a-f;*
Figure 2:
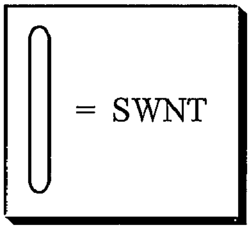

The above-described functionalization reactions are illustrated schematically in FIG. 2 (Scheme 1), wherein SWNTs are first intercalated/reduced with lithium (or other suitable alkali metal) in anhydrous liquid ammonia, an then reacted with an organic halide 1 to yield functionalized SWNTs 2*a-f*, wherein organic halides 1*a-f* are provided as examples. While not intending to be bound by theory, the debundling can be explained in terms of extensive intercalation by the lithium (or other alkali metal), leading to lithium ions dispersed between the negatively charged tubes, as shown in FIG. 2. The intense blue color associated with solvated electrons disappears rapidly as the lithium is added to the suspension of nanotubes in liquid ammonia, suggesting that electron transfer to the SWNTs is a facile process. Preliminary experiments using Raman spectroscopy suggest that the carbon/lithium ratio is 2-3. Addition of the alkyl halide would lead to the formation of a radical anion that would dissociate readily to yield halide and the alkyl radical. While not intending to be bound by theory, a gas chromatography-mass spectrometry (GC-MS) analysis of the filtrate provides strong evidence for a radical pathway (see Example 7). Additionally, radical anions formed by electron transfer to carbonyl groups of ketones can also add readily to the sidewalls of SWNTs.

Functionalization of carbon nanotubes provides a method to render them soluble in common organic solvents, thus making them amendable for composite formation and spinning into fibers. For example, alkylated SWNTs exhibit relatively high levels of solubility in solvents such as chloroform ($CHCl_3$), tetrahydrofuran (THF), and N,N-dimethylformamide (DMF). Functionalization of other graphitic-like surfaces, such as carbon black, facilitates their dispersion in various elastomers and polymers. Additionally, the methods of functionalizing CNTs according to embodiments of the present invention, are generally milder (i.e., do not require ultrasonication) and cause less damage to the CNTs than do existing prior art methods of functionalization that typically involve ultrasonication.

Such above-described reductive functionalization methods allow various functional groups (e.g., alkyl-, aryl-, allyl-, and benzyl-) to be added to the sidewalls of carbon nanotubes. In some embodiments, further (subsequent) functionalization of these groups is possible. In some embodiments, various anhydrous amines may be used as solvents instead of, or in addition to, anhydrous ammonia. Considerable variation exists in the amount and types of reagents, reaction times, etc., and in the steps of quenching, acidifying, filtering, and washing. Additionally, the methods of the present invention are scalable to much larger quantities.

Polymerization Reactions

In some or other embodiments, the present invention is directed to a process that comprises the following steps: (a) placing carbon nanotubes in a flame dried three-neck flask equipped with a dry ice condenser; (b) condensing $NH_3$ gas into the flask and then adding small pieces of alkali metal, followed by addition of monomer (e.g., alkyne/alkene); (c) allowing the reaction to proceed overnight; (d) quenching the reaction mixture with alcohol, followed by acidification with a mineral acid; and (e) filtering the contents through a membrane filter and washing thoroughly with alcohol and then with hexanes to remove by-products. Generally, suitable monomers comprise regions of unsaturation (i.e., double or triple bonds, or oligomeric ethylene oxide).

A detailed description of such an above-described method of polymerization, being yet another embodiment of the present invention, that allows for the in situ polymerization of monomeric material via a reductive pathway to form polymer chains attached to the sidewalls of carbon nanotubes, or generally any graphitic surface, follows: Carbon nanotubes were added to a flame dried three-neck flask. Ammonia was then condensed into the flask followed by addition of lithium metal. Various monomers including methyl methacrylate, acrylonitrile, and acetylene were then added to the reaction flask and allowed to stand overnight as the ammonia evaporated. Ethanol was then added followed by the addition of 10% HCl until the reaction mixture became acidic. The contents were transferred to a separating funnel and the functionalized carbon nanotubes were extracted into chloroform. The extract washed with a water/ethanol mixture and filtered through a 0.2 μm PTFE (polytetraflouroethylene) membrane filter.

Considerable variation exists in such above-described methods for making carbon material/polymer composites via in situ polymerization. Various monomeric species or combinations of species can be used. Additionally, variation exists in the amount and types of reagents, reaction times, etc., and in the steps of quenching, acidifying, filtering, and washing.

In the case of in situ polymerization on CNTs, the carbon nanotubes are chemically bound to the polymer, and they can serve as mechanical reinforcements for light weight composite systems with further promise of multifunctionality. Using methods such as those described herein, various polymers can be attached chemically to the nanotubes, and further functionalization of these attached polymer chains is possible.

While not intending to be bound by theory, it is believed that at least in some embodiments of the present invention, a Birch-type reduction takes place in which the CNTs, or other carbon material, are reduced at the surface by the alkali metal. This reduced surface can then react with organic (e.g., alkyl/aryl) halides to form functionalized CNTs, or with monomers for in situ polymerization. Additionally, in embodiments involving CNTs, debundling of the nanotubes (particularly SWNTs) in the absence of ultrasonication can be explained in terms of extensive intercalation by the alkali metal, leading to alkali ions dispersed between the negatively charged nanotubes. As mentioned above for the functionalization reactions, experimentally, when using lithium metal, the intense blue color associated with solvated electrons disappears rapidly as the lithium is added to the suspension of nanotubes in liquid ammonia, suggesting that electron transfer to the SWNTs is a facile process.

The following examples are provided to demonstrate particular embodiments of the present invention. It should be appreciated by those of skill in the art that the methods disclosed in the examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLE 1

This Example serves to illustrate alkylation of carbon nanotubes by $Li/NH_3$ reduction in the presence of n-butylbromide, as depicted in Equation 1 (Eq. 1).

$$\text{SWNTs(raw)}+Li/NH_3+CH_3\text{—}(CH_2)_3\text{—}Br\rightarrow \text{n-butylated SWNTs} \quad \text{(Eq. 1)}$$

In a flame-dried 100 mL 3-neck round bottomed flask equipped with a stirring bar and fitted with a dry ice condenser were placed 20 mg of raw (fluffy, as-produced) single-wall carbon nanotubes (SWNTs). After flushing the flask with argon (Ar), it was immersed in a dry ice/acetone bath and $NH_3$ gas (~60 mL) was condensed in it. Then, to this was added 300 mg of Li metal in small portions. Upon addition of the Li, the mixture turns deep blue in color. After five minutes, 0.53 mL of n-butylbromide was added. The ice bath was removed and the reaction was allowed to proceed overnight with slow evaporation of $NH_3$. The next morning the reaction was worked up by first adding 10 mL methanol and then 20 mL of water while the flask was in an ice bath. The contents of the flask were acidified with 10% HCl, and then filtered over a 0.2 μm pore size polytetrafluoroethylene (PTFE) membrane filter. The material left on the filter was placed in 20 mL ethyl alcohol and sonicated for 20 min and then filtered again on a 0.2 μm PTFE membrane filter. Then, the same process was repeated with benzene and tetrahydrofuran (THF). The bucky paper (SWNTs) thus obtained was used for subsequent Raman analysis.

Figure 3:
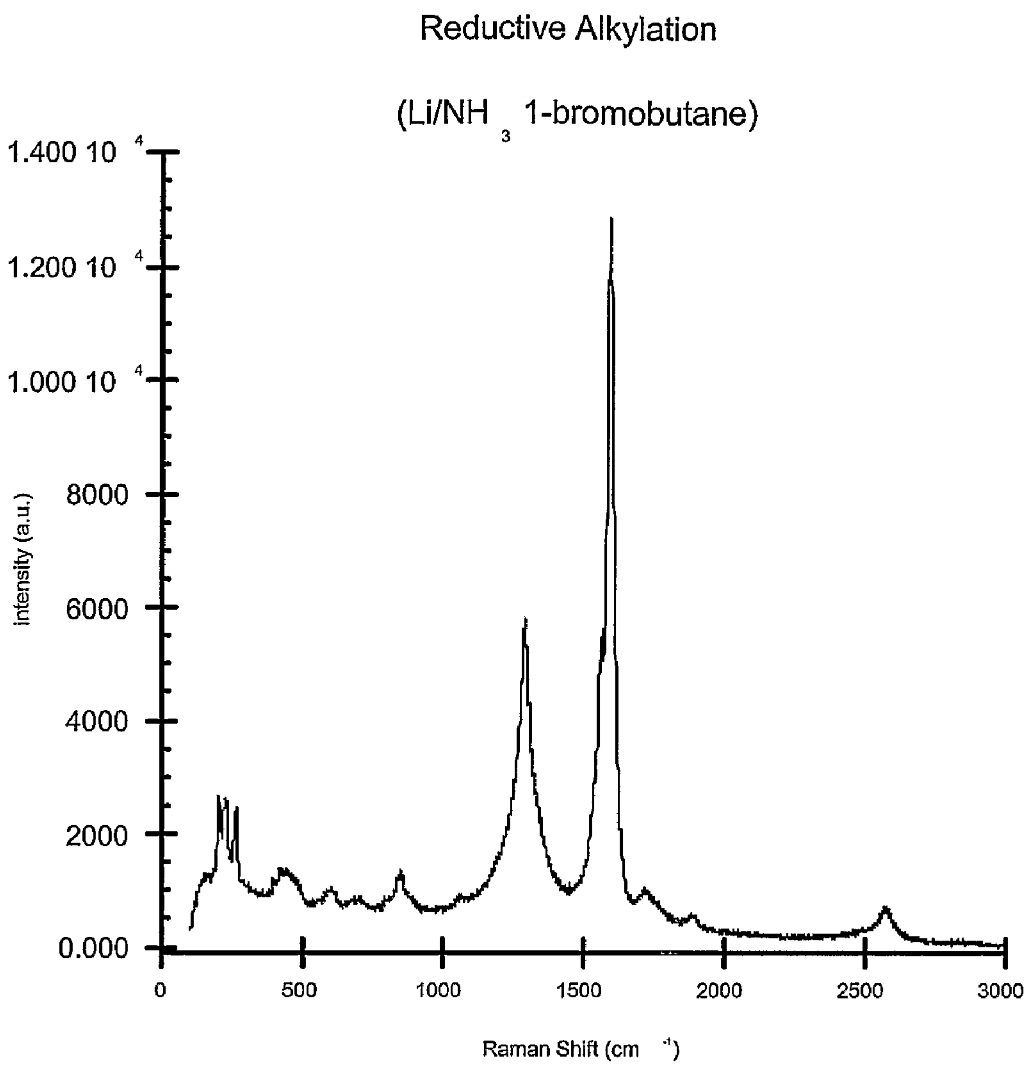
FIG. 3 is a Raman spectrum (780 nm excitation) of raw SWNTs that have been butylated according to methods of the present invention.

The Raman analysis reveals a substantial disorder peak which indicates that the reaction proceeds to derivatize the carbon nanotubes as described. Note that the increase in the disorder peak stems from the fact that, functional group addition changes the carbons within the nanotube cage to which the functional groups are added from being predominately $sp^2$ in character to being predominately $sp^3$ in character. This Raman analysis is depicted in FIG. 3.

EXAMPLE 2

This Example serves to illustrate benzylation of carbon nanotubes by $Li/NH_3$ reduction in the presence of benzyl chloride, as shown by Eq. 2.

$$\text{SWNTs(raw)}+Li/NH_3+(C_6H_5)\text{—}CH_2\text{—}Cl\rightarrow \text{benzylated SWNTs} \quad \text{(Eq. 2)}$$

Figure 4:
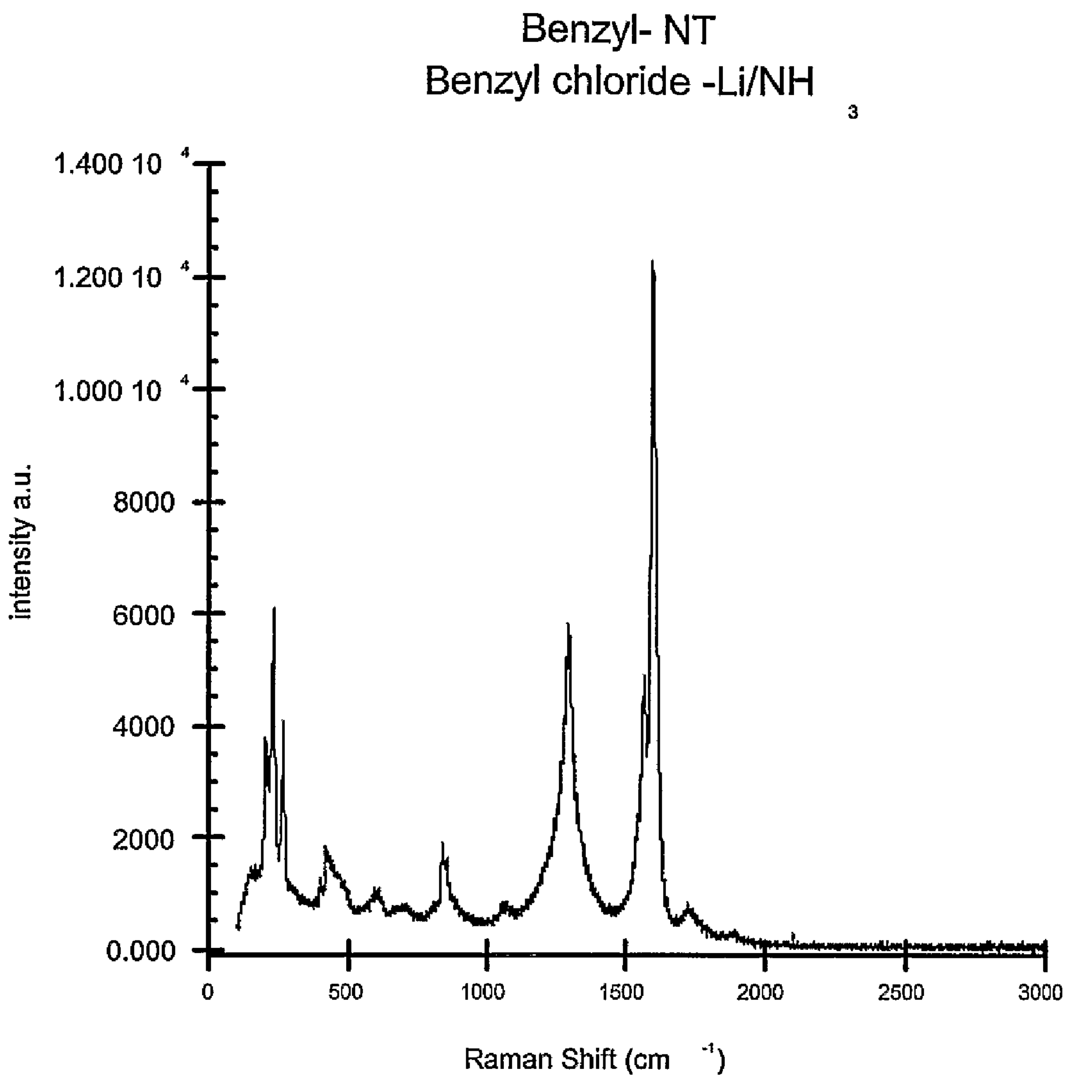
FIG. 4 is a Raman spectrum (780 nm excitation) of raw SWNTs that have been benzylated according to methods of the present invention.

This reaction was carried out in a manner similar to that described in EXAMPLE 1. In a flame dried 100 mL 3-neck round bottom flask was placed 20 mg of raw single-wall carbon nanotubes. Then, to this flask was condensed ~60 mL of $NH_3$, followed by the addition of Li metal in very small pieces (~462 mg total). After the complete addition of Li, ~2.108 g (1.92 mL) of benzylchloride was added to the flask with a syringe. The ice bath below the flask was subsequently removed and the reaction was allowed to proceed overnight with slow evaporation of $NH_3$. The reaction was worked up by first quenching the reaction mixture with 10 mL of methanol followed by the addition of 20 mL of $H_2O$ and then acidification with 10% HCl. Repeated washing of the material with ethanol over 0.2 μm PTFE membrane filter gave bucky paper, which was used for further analysis. Raman analysis revealed a significant disorder peak, as shown in FIG. 4.

EXAMPLE 3

This Example serves to illustrate dodecylation of carbon nanotubes by $Li/NH_3$ reduction in the presence of n-dodecyl iodide, as shown by Eq. 3.

$$SWNTs(raw)+Li/NH_3+CH_3—(CH_2)_{11}—I \rightarrow \text{n-dodecylated SWNTs} \quad \text{(Eq. 3)}$$

Figure 5:
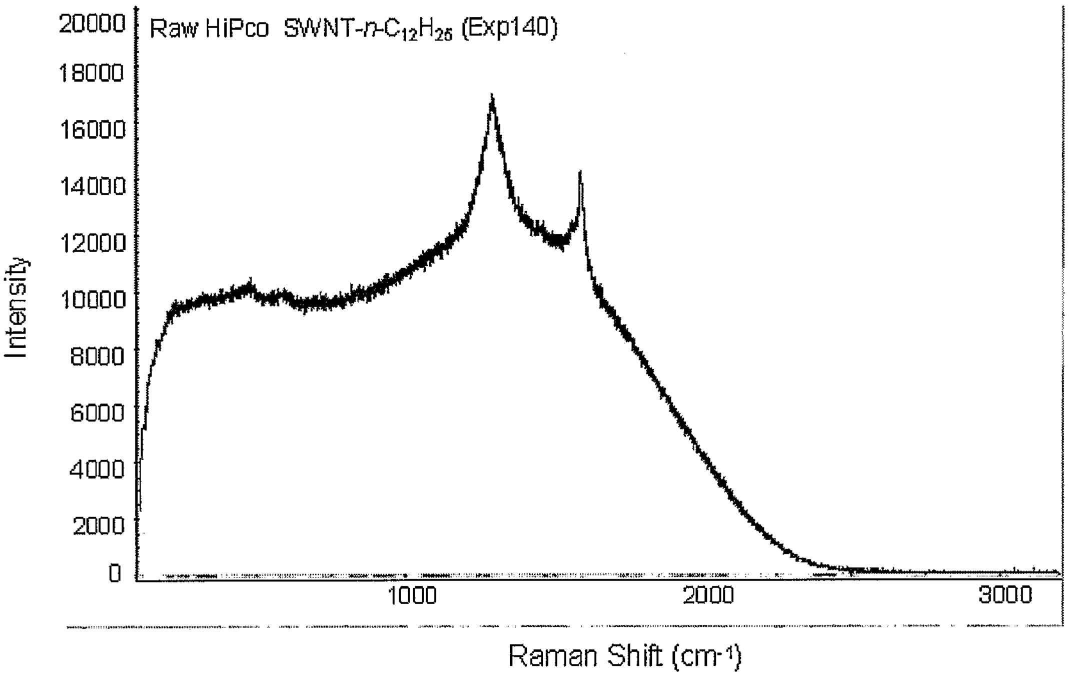
FIG. 5 is a Raman spectrum (780 mm excitation) of raw SWNTs that have been dodecylated according to methods of the present invention.

In a flame-dried 100 mL 3-neck round bottomed flask fitted with a dry ice condenser were placed 20 mg of raw single-wall carbon nanotubes. After flushing the flask with Ar, $NH_3$ gas (~60 mL) was condensed in it. To this was added Li metal in small portions (~462 mg total). Upon addition of the Li, the mixture turned deep blue in color. After five minutes, 4.933 g (4.107 mL) of 1-iodododecane was added. The ice bath was removed and the reaction was allowed to proceed overnight with slow evaporation of $NH_3$. The next morning the reaction was worked up by first adding 10 mL methanol and then 20 mL of water while the flask was in an ice bath. Then it was acidified with 10% HCl until acidic. It was subsequently filtered over a 0.2 μm pore size PTFE membrane filter. The material on the filter was then sonicated in 30 mL of ethanol and filtered again and then washed with an ethanol/hexane mixture (2:1). The resulting material on the membrane filter was determined to have exceptional solubility in $CHCl_3$. The bucky paper (SWNT mat) thus obtained was used for subsequent Raman analysis which revealed a significant disorder peak as shown in FIG. 5.

EXAMPLE 4

This Example serves to illustrate octylation of carbon nanotubes by $Li/NH_3$ reduction in the presence of n-octyl iodide, as shown by Eq. 4.

$$SWNTs(raw)+Li/NH_3+CH_3—(CH_2)_7—Br \rightarrow \text{n-octylated SWNTs} \quad \text{(Eq. 4)}$$

In a flame-dried 100 mL 3-neck round bottomed flask fitted with a dry ice condenser were placed 20 mg of raw single-wall carbon nanotubes. Then to the flask ~60 mL of $NH_3$ gas was condensed followed by the addition of very small pieces of Li metal (462 mg total). After the addition of lithium, ~3.00 mL (3.998 g) of n-octyliodide was added with a syringe. The reaction was allowed to proceed overnight with slow evaporation of $NH_3$. Then, the reaction in mixture was quenched with slow addition of 10 mL of alcohol while keeping the flask in the ice bath. Then, 20 mL of water was added slowly, followed by the addition of 10% HCl until acidic. The contents were filtered over 0.2 μm PTFE membrane filter. The material left on filter paper washed repeatedly with alcohol followed by hexanes.

EXAMPLE 5

This Example serves to illustrate tert-butylation of carbon nanotubes by $Li/NH_3$ reduction in the presence of t-butyl iodide, as shown by Eq. 5.

$$SWNTs(raw)+Li/NH_3+(CH_3)_3C—I \rightarrow \text{t-butylated SWNTs} \quad \text{(Eq. 5)}$$

In a flame-dried 100 mL 3-neck round bottom flask was placed 20 mg of raw single-wall carbon nanotubes. Then, to this flask was condensed ~70 mL of $NH_3$, followed by the addition of Li metal in very small pieces (~462 mg total). After the complete addition of Li, ~3.065 g (1.99 mL) of t-butyl iodide was added to the flask with a syringe. The ice bath below the flask was subsequently removed and the reaction was allowed to proceed overnight with slow evaporation of $NH_3$. The reaction was worked up by first quenching the reaction mixture with 10 mL of methanol followed by the addition of 20 mL of $H_2O$ and then acidification with 10% HCl. Repeated washing of the material with ethanol over 0.2 μm PTFE membrane filter gave bucky paper, which was used for further analysis.

EXAMPLE 6

This Example serves to illustrate dodecylation of purified carbon nanotubes by $Li/NH_3$ reduction in the presence of n-dodecyl iodide, as shown by Eq. 6.

$$SWNTs(purified)+Li/NH_3+CH_3—(CH_2)_{11}—I \rightarrow \text{n-dodecylated SWNTs} \quad \text{(Eq. 6)}$$

Figure 6:
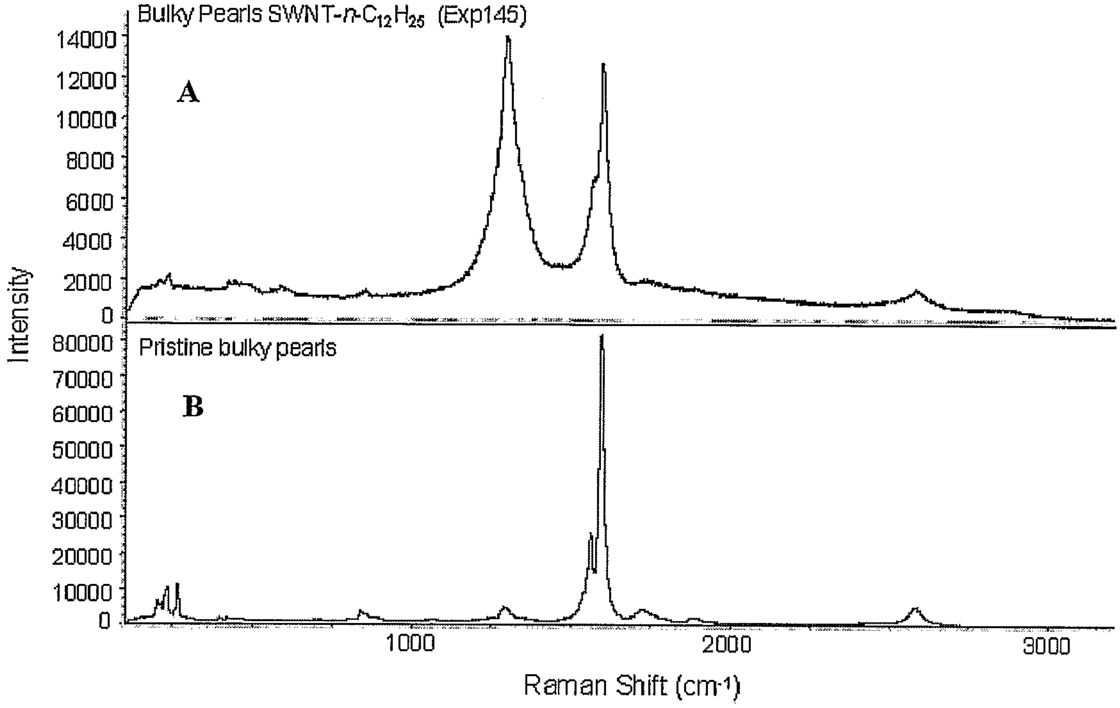
FIGS. 6(A) and (B) are Raman spectra (780 nm excitation) of pure (B) and dodecylated bucky pearls (A) samples.
Figure 7:
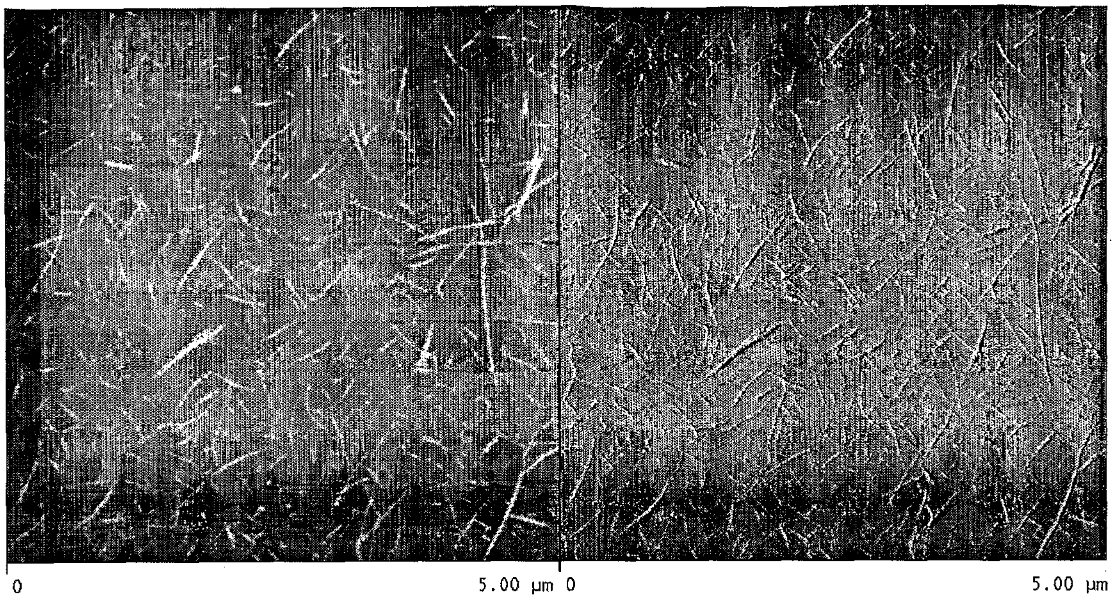
FIG. 7 is an AFM image of the dodecylated purified SWNTs.
Figure 8:
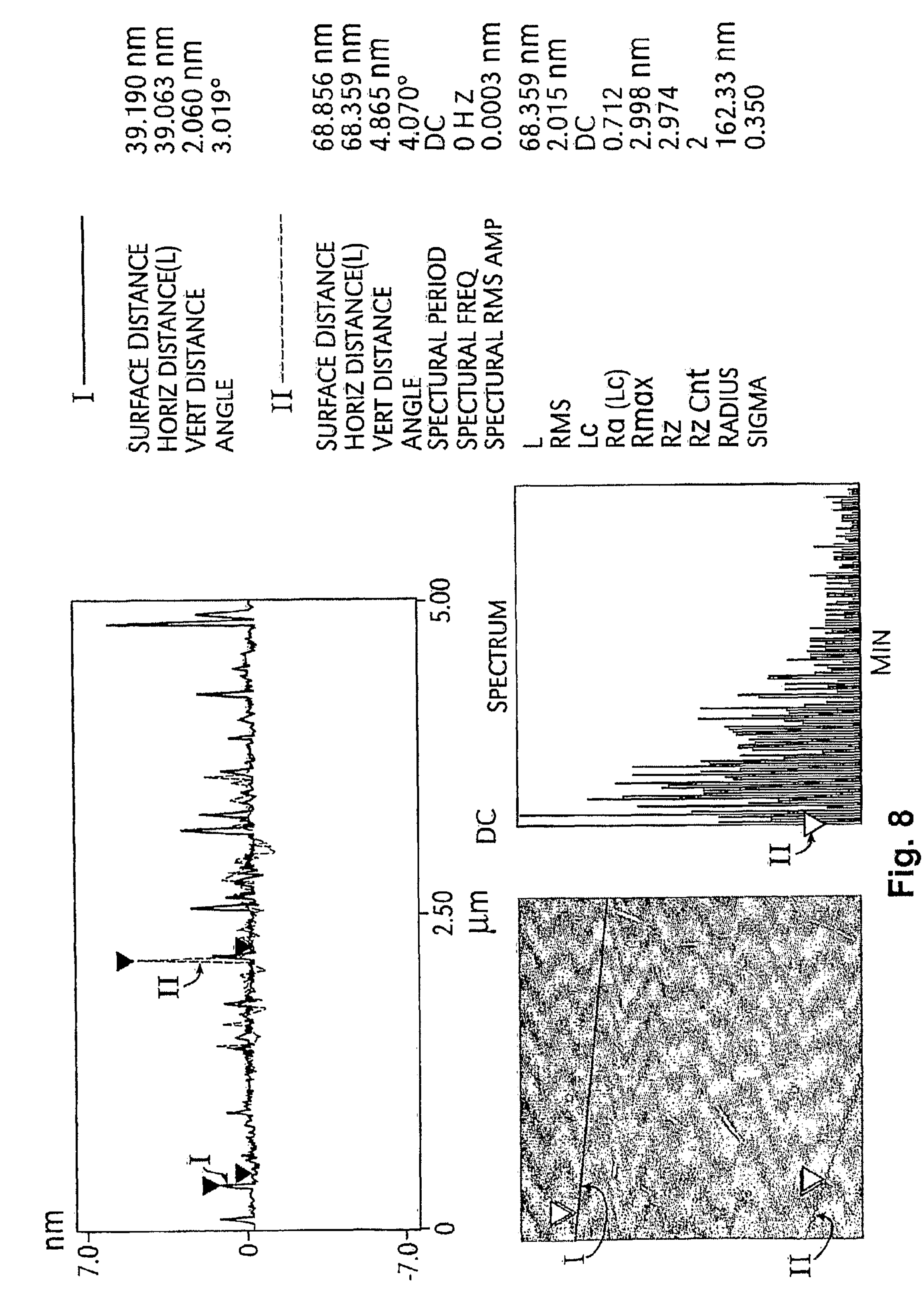
FIG. 8 is a section analysis of the AFM image shown in FIG. 7.
Figure 9:
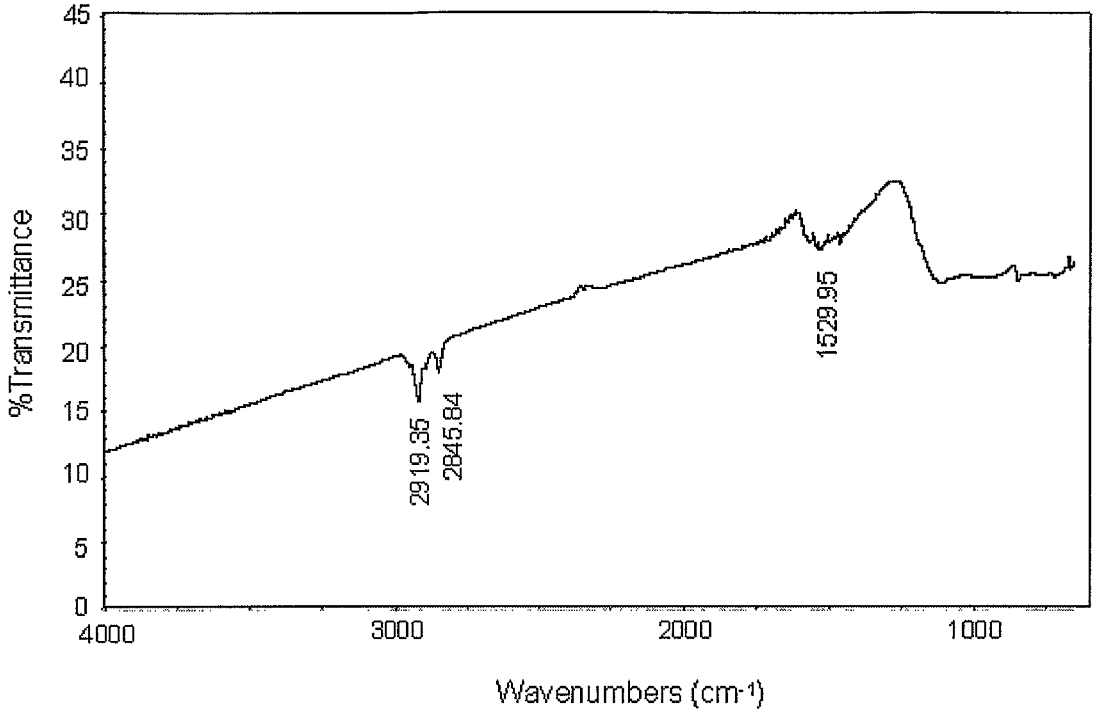
FIG. 9 is an FTIR spectrum of dodecylated purified SWNTs prepared in accordance with an embodiment of the present invention.
Figure 10:
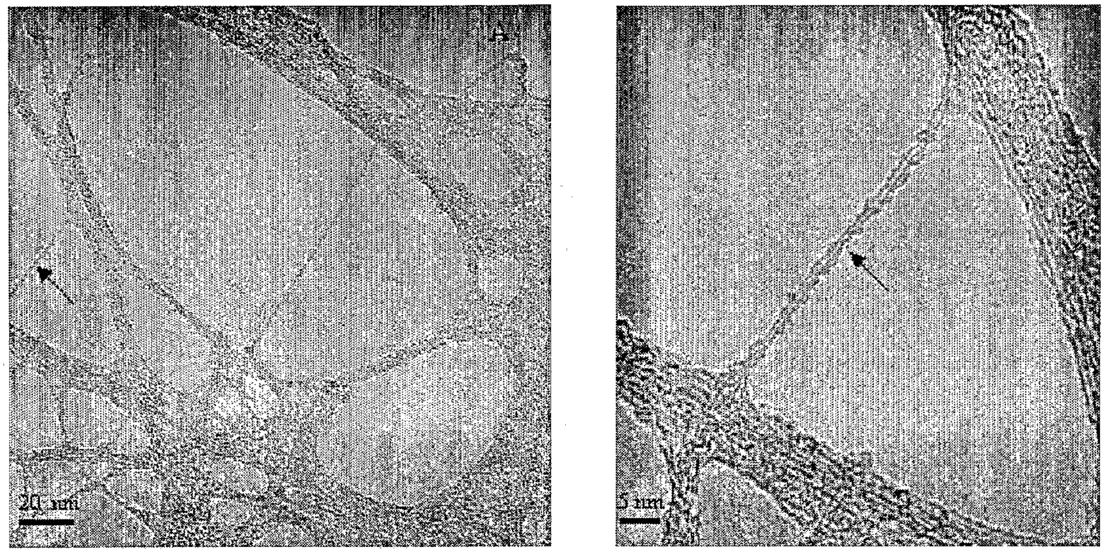
FIGS. 10(A) and (B) are high resolution transmission electron microscopy (HRTEM) images of dodecylated purified SWNTs showing individual nanotubes and extensive debundling.

For comparative purposes, the process described in EXAMPLE 3 was carried out using purified SWNTs. Specifically, the purified SWNTs used were a high density type known as "bucky pearls." Raman analysis, as shown in FIG. 6, suggests that the derivatization processes of the present invention work at least as well on purified SWNT material as they do on raw SWNT material. FIG. 7 is an atomic force microscopy (AFM) image of the dodecylated SWNTs produced in this example, and FIG. 8 is the corresponding section analysis. Both FIGS. 7 and 8 reveal substantial debundling of the SWNTs (from their roped state) and a plethora of individual SWNTs-indicative of significant derivatization. FIG. 9 is an FTIR spectrum of dodecylated SWNTs, and FIGS. 10(A) and (B) are high resolution transmission electron microscopy (HRTEM) images of dodecylated SWNTs showing individual nanotubes and extensive debundling.

EXAMPLE 7

This example details GC-MS evidence for the proposed radical pathway for the reactions of the present invention.

Figure 11:
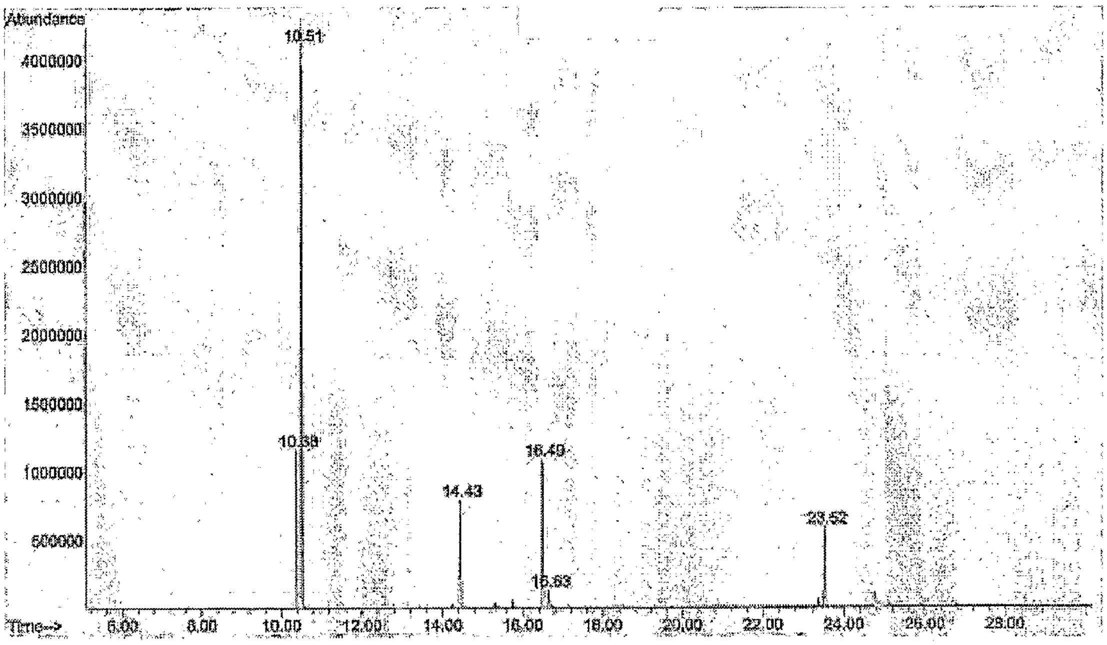
FIG. 11 depicts a GC-MS chromatogram of mass peaks (temperature profile: 2 minute hold at 50° C., ramp 10° C./minute to 280° C., 5 minute hold at 280° C.) representing by-products in the preparation of dodecylated SWNTs 2*a;*

FIG. 11 depicts a GC-MS chromatogram of mass peaks (temperature profile: 2 minute hold at 50° C., ramp 10° C./minute to 280° C., 5 minute hold at 280° C.) representing by-products in the preparation of n-dodecylated SWNTs (Example 6) where:

T=10.38 min: n-$C_{12}H_{24}$ (M+168)

T=10.51 min: n-$C_{12}H_{26}$ (M+170)

T=14.43 min: rearrangement of n-$C_{12}H_{24}$ (M+168)

T=16.49 min: $C_{21}H_{44}$ (M+296)

T=23.52 min: n-$C_{24}H_{50}$ (M+338)

Thus n-$C_{12}H_{26}$, n-$C_{12}H_{24}$ and n-$C_{24}H_{50}$ are formed as major by-products when n-dodecyl iodide is used as the alkylating reagent. n-$C_{12}H_{26}$ and n-$C_{12}H_{24}$ would arise from disproportionation of the dodecyl radical whereas n-$C_{24}H_{50}$ is formed by dimerization of dodecyl radicals.

EXAMPLE 8

This example illustrates thermal gravimetric analysis (TGA) of products 2*a-f*.

Figure 12:
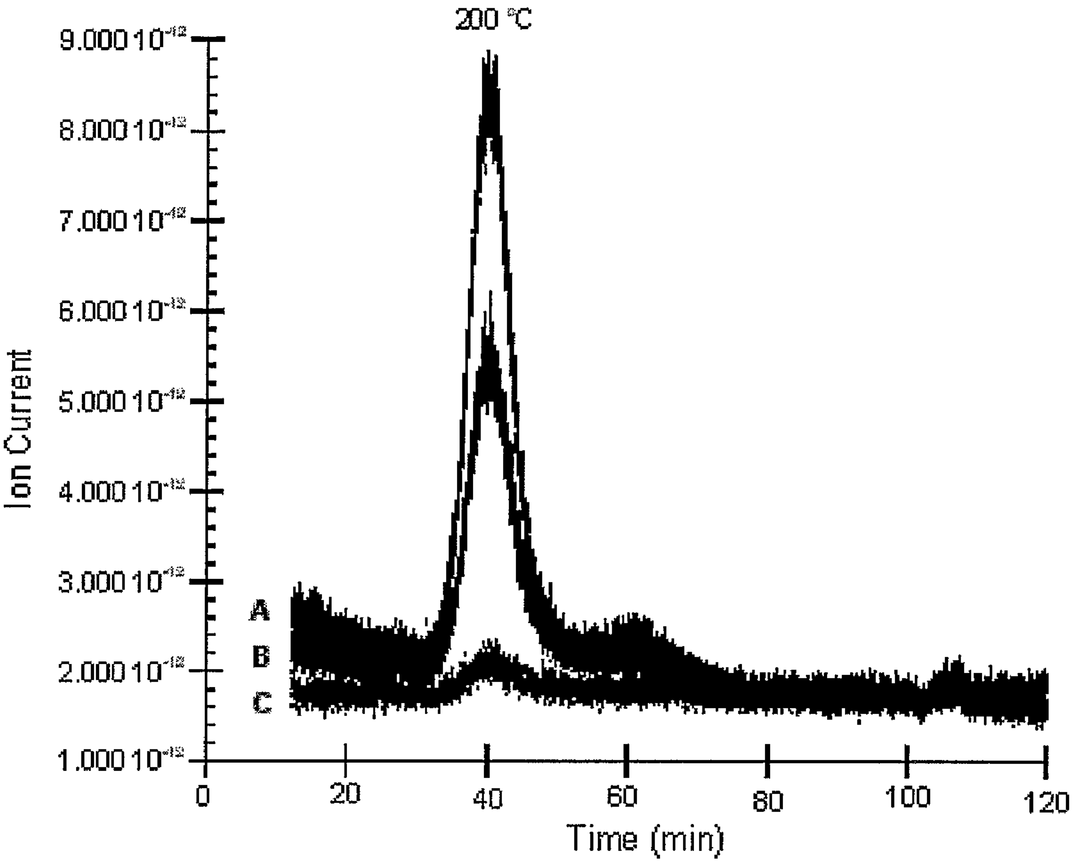
FIG. 12 depicts a TGA-MS analysis of the evolution products from n-butylated SWNTs where ion current vs. time plots for m/z ions (A) 57 $CH_3CH_2CH_2CH_2$, (B) 56 $CH_3CH_2CH{=}CH_2$, (C) 58 $CH_3CH_2CH_2CH_3$ are shown in the figure.

Further evidence for covalent functionalization of the SWNTs has been provided by thermogravimetric analyses (TGA) of n-butylated SWNTs in the 100-800° C. range connected with online monitoring of the volatile products by a mass spectrometer (MS) operating in electron impact ionization mode. This is referred to as TGA-MS analysis. The evolution of n-butyl groups at about 200° C. is shown by major peaks at m/z 57 $\{CH_3CH_2CH_2CH_2\}$ and 56 $\{CH_3CH_2CH{=}CH_2\}$ as well as a smaller peak at m/z 58 $\{CH_3CH_2CH_2CH_3\}$. These results are presented in FIG. 12.

TGA analysis also provides a measure of the degree of functionalization. Weight loss and carbon/alkyl group ratios are presented in Table 1 below.

TABLE 1

Weight Loss and Estimated Carbon/Alkyl Group Ratio from TGA Analysis at 800° C. in Argon.

| Compound | Weight loss (%) observed | Carbon/alkyl group ratio |
|---|---|---|
| 2a | 41 | 20 |
| 2b | 22 | 17 |
| 2c | 16 | 25 |
| 2d | 16 | 26 |
| 2e | 25 | 35 |
| 2f | 15 | 28 |

EXAMPLE 9

Figure 13:
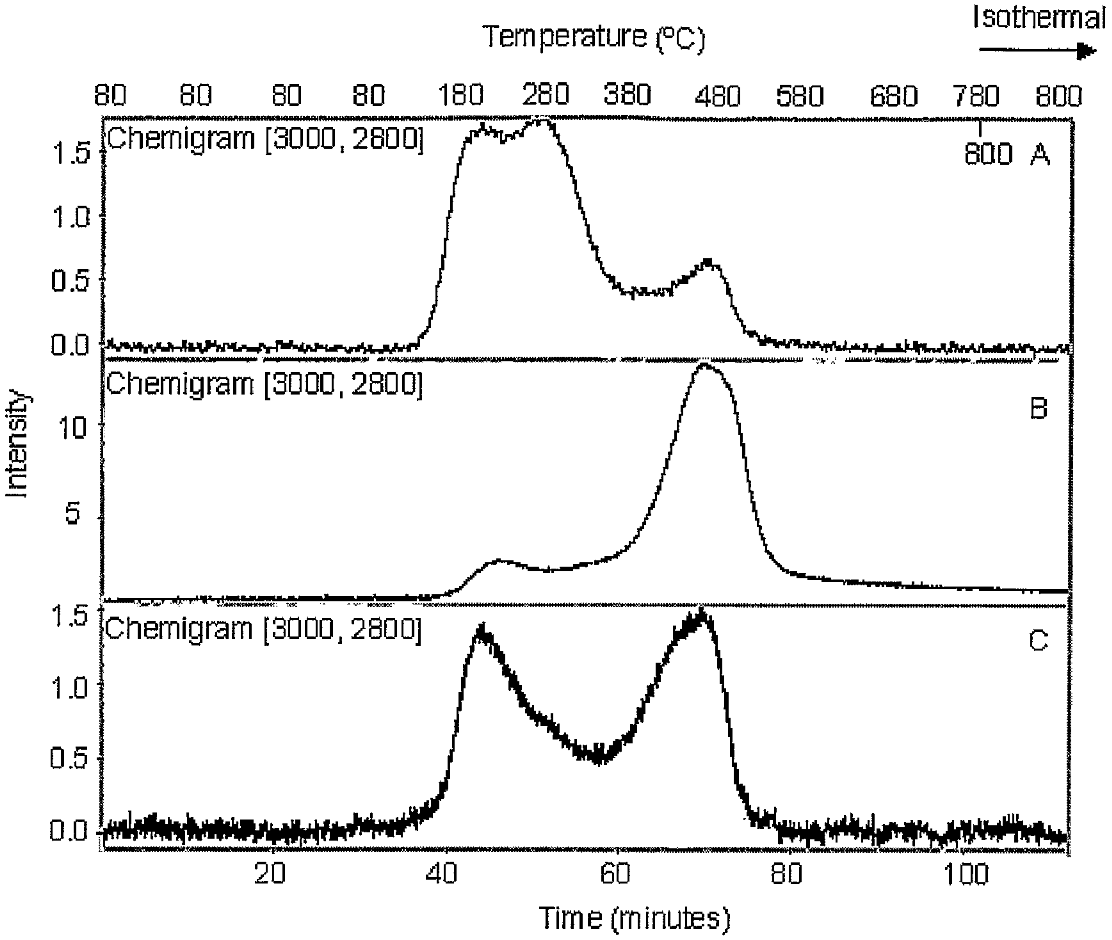
FIG. 13 depicts chemigrams of n-dodecylated SWNTs that were functionalized by three different alkali metals (A) from lithium; (B) from sodium; (C) from potassium, where chemical detection is provided by TGA-FTIR.

This example serves to illustrate the thermal stability range of functionalized SWNTs prepared in accordance with the methods of the present invention.

n-Dodecylated SWNTs were pyrolyzed in an argon atmosphere to a temperature of 800° C. To investigate the process in situ, the pyrolysis was done in the furnace of a thermogravimetric analysis (TGA) apparatus, which was coupled with a Fourier transform-infrared (FT-IR) spectrophotometer. The sample was held at 80° C. for 30 minutes, ramped 10° C. $min^{-1}$ to 800° C., then isothermally held for 10 minutes at 800° C. The gaseous species released from the sample during the pyrolysis were fed into the FT-IR spectrophotometer, and their concentration variations during the pyrolysis process were monitored with time and/or temperature. Referring to FIG. 13, n-dodecylated SWNTs produced using different alkali metals show quite different profiles in the TGA-FTIR. Reactions using lithium (Trace A) show two major peaks during the pyrolysis process: a major peak at around 160-300° C., and a small peak at around 480° C. Using sodium (Trace B) produces a quite different profile: one small peak at around 180-280° C. and a major peak that appears at 380-530° C. For the case of potassium (Trace C), two peaks of similar intensity are shown at two different temperature regions.

EXAMPLE 10

This example serves to illustrate polymerization of methyl methacrylate which is initiated by lithiated SWNTs, as depicted by Eq. 7.

$$\text{SWNTs(purified)}+\text{Li}/NH_3+CH_2{=}C(CH_3)COOCH_3\rightarrow\text{SWNTs-PMMA} \quad \text{(Eq.7)}$$

Methyl methacrylate washed twice with 5% NaOH, twice with water, then dried over anhydrous $MgSO_4$, $CaH_2$ and then vacuum distilled. A sealed flame-dried 100 mL three-neck round-bottom flask containing 20 mg of purified single-wall carbon nanotubes was degassed and refilled with argon three times. Approximately 70 mL of $NH_3$ was then condensed into the flask followed by the addition of small pieces of lithium metal (~10 mg total) until a slightly blue color remained. Approximately 3.500 g (3.7 mL) of methyl methacrylate was then added to the flask with a syringe. The ice bath was then removed and the reaction was allowed to proceed overnight with the slow evaporation of $NH_3$. The reaction was worked up by first quenching the reaction mixture with 10 mL of methanol followed by the addition of 20 mL of $H_2O$. After acidification with 10% HCl, the nanotubes were extracted into hexanes and washed several times with water. The hexane layer was then filtered through a 0.2 μm PTFE membrane filter, washed with ethanol, chloroform and then dried in a vacuum oven (80° C.) overnight.

Figure 14:
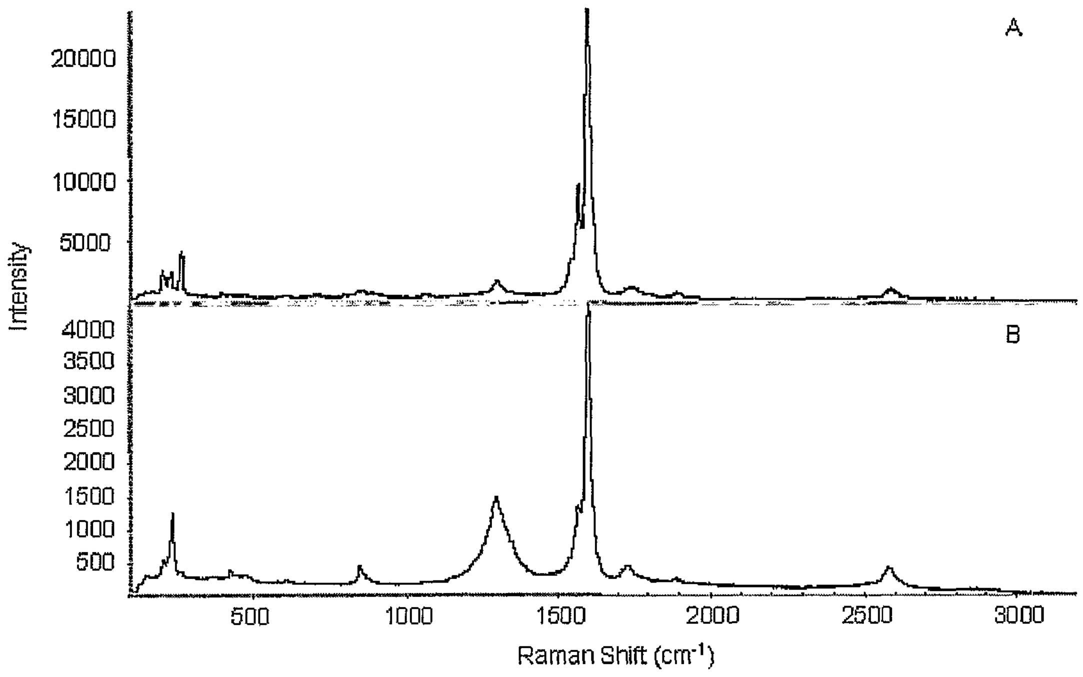
FIGS. 14(A) and (B) are Raman spectra (780 nm excitation) of pristine SWNTs (A) and SWNTs-PMMA (B)
Figure 15:
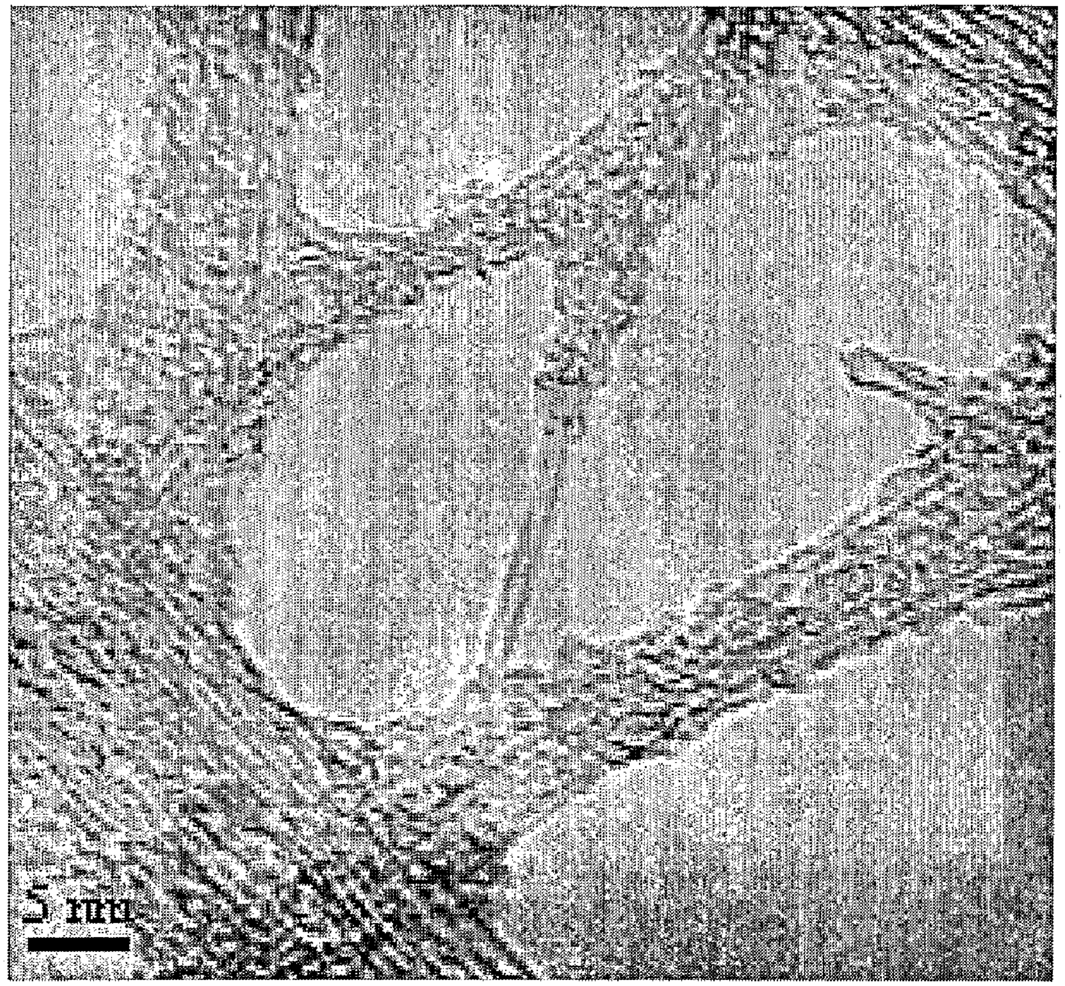
FIG. 15 is a TEM image of SWNTs-PMMA.
Figure 16:
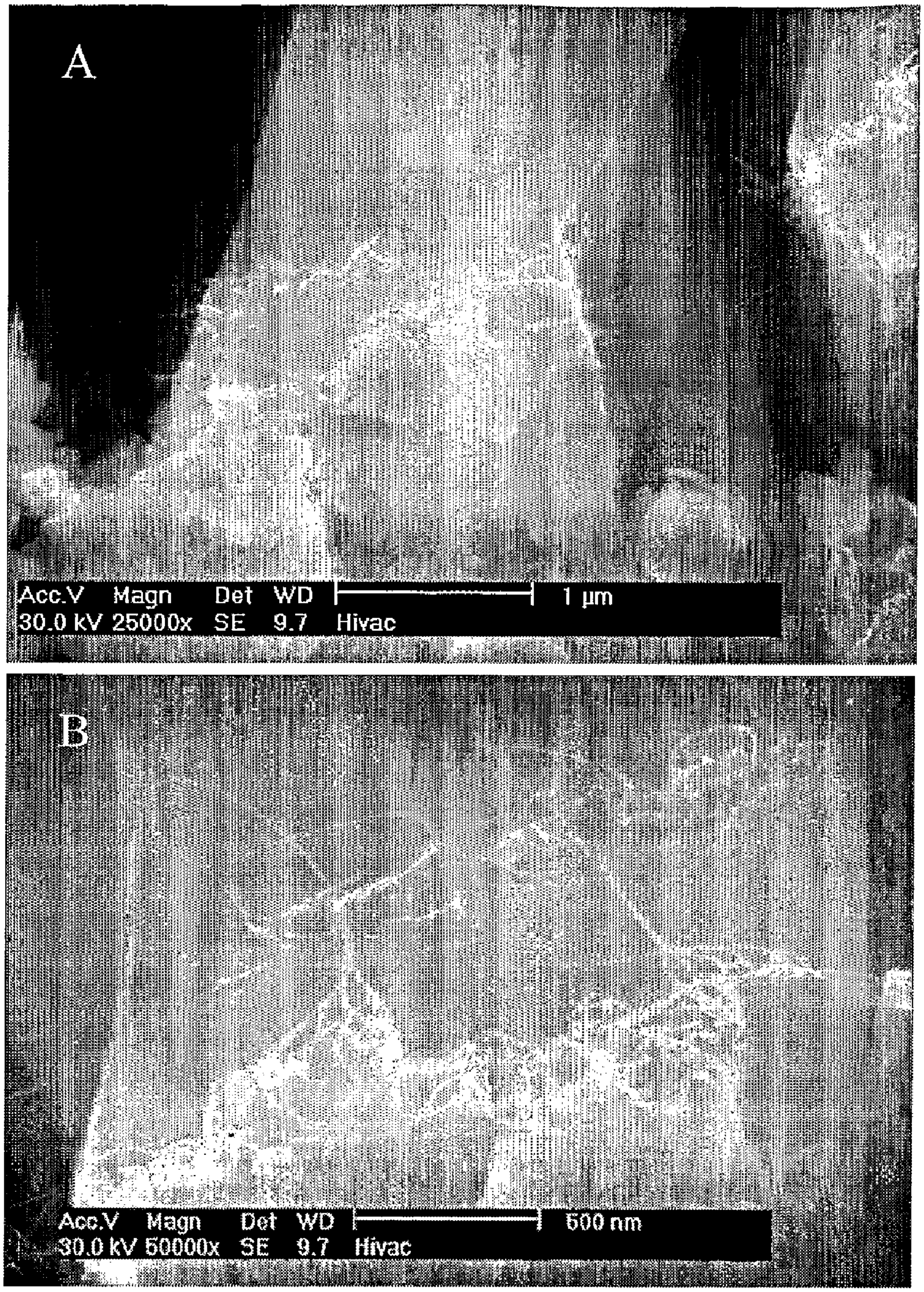
FIGS. 16(A) and (B) are SEM images, at different magnifications, of SWNTs-PMMA.

FIGS. 14(A) and (B) are Raman spectra (780 nm excitation) of pristine SWNTs (A) and SWNTs-PMMA (B). This Raman analysis provides evidence that the polymerization of methyl methacrylate has been achieved at/to the sidewall of the SWNTs. The transmission electron microscopy (TEM) image of the SWNTs-PMMA (FIG. 15) shows part of the nanotubes were covered with polymers. FIGS. 16(A) and (B) show scanning electron microscope (SEM) images of the SWNTs-PMMA, wherein (B) is at a higher magnification than (A).

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method comprising the steps of:

a) combining carbon nanotubes with anhydrous liquid ammonia to form a mixture;

b) dissolving a quantity of alkali metal in the mixture to form a reduced mixture comprising reduced carbon nanotubes; and c) adding an organic halide to the reduced mixture;

wherein the organic halide comprises an organic portion and a halide portion;

wherein the organic portion adds to the reduced carbon nanotubes on their sidewalls to form sidewall-derivatized carbon nanotubes; and wherein the sidewall-derivatized carbon nanotubes comprise at least one carbon-carbon bond between the sidewalls of the carbon nanotubes and the organic portion.

2. The method of claim 1, further comprising a quenching step to neutralize excess alkali metal, wherein the quenching step comprises reacting the excess alkali metal with a quenching species selected from the group consisting of alcohols, water, and combinations thereof, to form a neutralized species selected from the group consisting of alkali oxides, alkali hydroxides, and combinations thereof.

3. The method of claim 2, further comprising an acidification step to neutralize unevaporated ammonia.

4. The method of claim 1, further comprising a filtration step to collect the sidewall-derivatized carbon nanotubes.

5. The method of claim 4, further comprising a washing step to remove other species from the collected sidewall-derivatized carbon nanotubes.

6. The method of claim 1, wherein the carbon nanotubes are single-wall carbon nanotubes.

7. The method of claim 1, wherein the carbon nanotubes are small diameter carbon nanotubes;

wherein the small diameter carbon nanotubes have diameters of at most about 3 nM.

8. The method of claim 1, wherein the alkali metal is selected from the group consisting of lithium, sodium, potassium, and combinations thereof.

9. The method of claim 1, wherein the halide portion is selected from the group consisting of —F, —Cl, —Br, —I, and combinations thereof.

10. The method of claim 1, wherein the organic portion is selected from the group consisting of alkyl-, aryl-, allyl-, benzyl-, and combinations thereof.

11. A method comprising the steps of:

a) combining carbon nanotubes with anhydrous liquid ammonia to form a mixture;

b) dissolving a quantity of alkali metal in the mixture to form a reduced mixture comprising reduced carbon nanotubes;

c) adding a quantity of at least one monomer species to the reduced mixture; and d) reacting the at least one monomer species with the reduced carbon nanotubes to form a composite material comprising polymer-functionalized carbon nanotubes;

wherein the polymer-functionalized carbon nanotubes consist of the carbon nanotubes and a polymer chemically bound to the sidewalls of the carbon nanotubes; and wherein the polymer is formed by polymerization of the at least one monomer species.

12. The method of claim 11, further comprising a quenching step to neutralize excess alkali metal, wherein the quenching step comprises reacting the excess alkali metal with a quenching species selected from the group consisting of alcohols, water, and combinations thereof, to form a neutralized species selected from the group consisting of alkali oxides, alkali hydroxides, and combinations thereof.

13. The method of claim 12, further comprising an acidification step to neutralize unevaporated ammonia.

14. The method of claim 11, further comprising a filtration step to collect the composite material.

15. The method of claim 14, further comprising a washing step to remove other species from the collected composite material.

16. The method of claim 11, wherein the carbon nanotubes are single-wall carbon nanotubes.

17. The method of claim 11, wherein the carbon nanotubes are small diameter carbon nanotubes;

wherein the small diameter carbon nanotubes have diameters of at most about 3 nm.

18. The method of claim 11, wherein the alkali metal is selected from the group consisting of lithium, sodium, potassium, and combinations thereof.

19. The method of claim 11, wherein the at least one monomer species is selected from the group consisting of vinyl monomers, acetylene, oligomeric ethylene oxide, and combinations thereof.

20. The method of claim 11, wherein the at least one monomer species is capable of undergoing free radical polymerization.

21. The method of claim 11, wherein the at least one monomer species is capable of undergoing anionic polymerization.

22. The method of claim 21, wherein the at least one monomer species is selected from the group consisting of alkenes, alkynes, oligomeric ethylene oxide, and combinations thereof.

23. A method comprising the steps of:

a) combining a carbon material with anhydrous liquid ammonia to form a mixture;

wherein the carbon material is selected from the group consisting of diamond, acetylenic carbon, carbon black, activated charcoal, graphitic carbon, and combinations thereof;

b) dissolving a quantity of alkali metal in the mixture to form a reduced mixture; and c) adding an organic halide to the reduced mixture;

wherein the organic halide comprises an organic portion and a halide portion;

wherein the organic portion adds to the carbon material to form a derivatized carbon material; and wherein the derivatized carbon material comprises a carbon-carbon bond between the derivatized carbon material and the organic portion.

24. A method comprising the steps of:

a) combining a carbon material with anhydrous liquid ammonia to form a mixture;

wherein the carbon material is selected from the group consisting of diamond, acetylenic carbon, carbon black, activated charcoal, graphitic carbon, and combinations thereof;

b) dissolving a quantity of alkali metal in the mixture to form a reduced mixture;

c) adding a quantity of at least one monomer species to the reduced mixture; and d) reacting the at least one monomer species with the carbon material to form a composite material comprising a polymer-functionalized carbon material;

wherein the polymer-functionalized carbon material consists of the carbon material and a polymer attached to the carbon material; and wherein the polymer is formed by polymerization of the at least one monomer species.

* * * * *